(12) United States Patent
Glass

(10) Patent No.: US 7,065,056 B2
(45) Date of Patent: Jun. 20, 2006

(54) TRANSCEIVER CIRCUIT INCLUDING AN ECHO CANCELLER

(75) Inventor: William Glass, Seyssinet-Pariset (FR)

(73) Assignee: STMicroelectronics S.A., Montrouge (FR)

( * ) Notice: Subject to any disclaimer, the term of this patent is extended or adjusted under 35 U.S.C. 154(b) by 877 days.

(21) Appl. No.: 09/896,827

(22) Filed: Jun. 29, 2001

(65) Prior Publication Data

US 2002/0048265 A1   Apr. 25, 2002

(30) Foreign Application Priority Data

Jul. 5, 2000   (FR) ................................. 00 08745

(51) Int. Cl.
*H04B 3/20* (2006.01)
(52) U.S. Cl. ...................... 370/286; 370/278; 370/289; 370/290; 370/291; 370/293; 375/3; 375/8; 375/406.01; 375/406.05; 375/406.06; 375/406.08; 375/412
(58) Field of Classification Search ................ 370/278, 370/285, 286, 289, 290, 291, 293; 379/3, 379/8, 406.01, 406.05, 406.06, 406.08, 406.09, 379/412, 400
See application file for complete search history.

(56) References Cited

U.S. PATENT DOCUMENTS

| 4,736,414 A | * | 4/1988 | Montagna et al. ..... 379/406.06 |
| 5,418,778 A | | 5/1995 | Cummiskey et al. |
| 5,721,782 A | | 2/1998 | Piket et al. |
| 5,920,548 A | * | 7/1999 | El Malki .................... 370/291 |

OTHER PUBLICATIONS

French Search Report from French Patent Application 00/08745, filed Jul. 5, 2000.

* cited by examiner

*Primary Examiner*—Wellington Chin
*Assistant Examiner*—Raj Jain
(74) *Attorney, Agent, or Firm*—Lisa K. Jorgenson; James H. Morris; Wolf, Greenfield & Sacks, P.C.

(57) ABSTRACT

A circuit for transmitting and receiving communications. The circuit includes a transmit block, a receive block, and an echo canceller, coupled to the transmit block and to the receive block, for determining an echo signal and subtracting it from the received signal, the determination of the echo signal involving a predetermined number N of coefficients calculated at the beginning of each of the communications in an initialization phase. The circuit periodically updates during communication a restricted group of coefficients chosen from among the most significant coefficients. The present invention also relates to an echo cancellation method.

31 Claims, 2 Drawing Sheets

TRANSCEIVER CIRCUIT INCLUDING AN ECHO CANCELLER

BACKGROUND OF THE INVENTION

1. Field of the Invention

The present invention relates to circuits for the simultaneous transmission and reception of signals ("full duplex" communications) over a transmission line, and especially circuits of this type including an echo canceller.

2. Discussion of the Related Art

Commonly-called "full-duplex" communications (simultaneous transmission and reception of signals) can be of two different types. In a first type, the signals are transmitted and received over different frequency ranges and, in a second type, they are transmitted and received over the same frequency range.

When the transmitted and received signals are in the same frequency range, the transmitted and received signals are superposed in the reception channel and an "echo canceller" is necessary to subtract from the received signals the fraction of the transmitted signals that is present on the receive side.

FIG. 1 shows a conventional circuit 2 including such an echo canceller. Circuit 2 is provided for exchanging signals with an exchange 4 via a two-wire transmission line 6. Circuit 2 includes a digital transmit block 8 and a digital receive block 10. Block 8 can receive signals to be transmitted from a microprocessor (not shown) and block 10 can provide the microprocessor with the received signals for processing. Circuit 2 then behaves as a modem. A digital-to-analog converter (DAC) 12 converts the digital signal provided by transmit block 8 into an analog output signal A. An analog-to-digital converter (ADC) 14 converts analog signal R corresponding to the received signal into a digital signal supplied to receive block 10.

An analog unit 16 is arranged between the output of converter 12, the input of converter 14, and a terminal 17 connected to one end of a primary winding of an isolation transformer 18. The other end of the primary winding of transformer 18 is grounded, and each end of the secondary winding of transformer 18 is connected to a wire of line 6. Unit 16 includes a resistor R1 connected between the output of converter 12 and terminal 17. Unit 16 also includes a voltage divider formed of two resistors R2 and R3 connected in series between the output of converter 12 and the ground. An analog subtractor 19 is connected to subtract the signal provided by the voltage divider from the signal present on terminal 17. The output of subtractor 19 is connected to the input of converter 14.

The value of resistor R1 is equal to the line impedance, as seen from the primary of transformer 18. Accordingly, signal A being provided by converter 12, a signal A/2 is present on terminal 17. Further, the values of resistors R2 and R3 are equal and the voltage divider provides a signal A/2 at its midpoint. When a signal B is provided by exchange 4, a signal A/2+B is present on terminal 17 and, at the output of subtractor 19, the signal is: R=A/2+B−A/2, that is, B. Thereby, signal R provided to converter 14 contains no disturbances from transmitted signal A.

In practice, it is difficult to perfectly adjust resistance R1 to the line impedance, which can by the way include a reactive component. Circuit 10 then receives a so-called "close echo" signal. This close echo is due to a fraction of signal A that is present in signal R without having crossed the transmission line. The circuit also receives a fainter so-called "remote echo" signal, due to the reflection of the transmitted signal at the end of the transmission line. The present invention does not deal with the remote echo signal, and "echo" will hereafter only designate the close echo.

When there is an echo $\Delta A$, signal R is equal to $B+\Delta A$. To suppress echo signal $\Delta A$, circuit 2 includes a digital echo canceller coupled between the output of block 8, the output of converter 14, and the input of block 10. The echo canceller includes a digital filter 20 for generating a signal representative of the echo and a digital subtractor 22 for subtracting this signal representative of the echo from the digital signal generated by converter 14.

FIG. 2 schematically shows a conventional filter 20. Filter 20 includes a predetermined number N of series-connected delay elements 26$i$, where i is included between 1 and N. The first element 261 receives as an input the samples corresponding to the digital signal provided by block 8. Elements 26$i$ each introduce a delay equal to the sampling period T of the transmitted signal. For each new sample D0 received as an input by element 261, elements 26$i$ each provide a sample $D_i$ respectively delayed by i periods with respect to sample D0. Filter 20 also includes N multipliers 28$i$. Each multiplier 28$i$ is provided for multiplying one of delayed elements $D_i$ by a coefficient $K_i$. Filter 20 includes an adder 30 that sums up the products $K_i.D_i$. Adder 30 provides the output signal of filter 20, designated as E, corresponding to an estimate of the echo. Coefficients $K_i$ are generated by a calculation means, not shown for reasons of clarity.

At the beginning of each communication, an initialization phase takes place. In this initialization phase, exchange 4 transmits no signal, block 8 transmits signal A, and signal R is equal to $\Delta A$ only. Each coefficient $K_i$, null at the beginning of the initialization phase, is iteratively calculated by means of the following equation:

$$K_i(t)=K_i(t-1)+\epsilon.Err(t).D_i(t) \qquad (1)$$

Two successive iterations are separated by an integral number of periods T. $K_i(t)$ and $K_i(t-1)$ respectively are the value of coefficient $K_i$ at time t of the iteration and upon the preceding iteration, $\epsilon$ is a predetermined attenuation factor, Err(t) and $D_i(t)$ respectively are the output signal of subtractor 22 and sample $D_i$ at time t of the iteration. Signal Err(t) can be positive or negative. In the initialization, the value of coefficients $K_i$ varies until signal Err(t) is substantially null. The values of coefficients $K_i$ then almost no longer vary and are stored in a memory (not shown).

After the initialization phase, the signal exchange starts and the exchange transmits a signal B; converter 14 receives an analog signal R equal to $B+\Delta A$ that it provides, in a digitized form, to subtractor 22. Filter 20 provides signal E corresponding to $\Delta A$ and block 10 receives an echo-free digital signal.

A disadvantage of such a device is that the values of coefficients $K_i$ are set during the entire communication and correspond to the operating conditions of circuit 2 during the initialization phase. Now, during circuit operation, the operating conditions may change, and the estimated echo signal E may no longer be equal to the real echo signal. For example, in operation, the circuit temperature increases and the transformer's impedance may change. Such a phenomenon currently occurs when the initialization phase takes place immediately after circuit powering-on, and the temperature of circuit 2 and of transformer 18 increases after the initialization phase. The echo, which is poorly compensated for, then disturbs the receive signal and can make it impossible to use.

A solution then consists of interrupting the ongoing communication and of initiating a new communication. This enables new calculation of coefficients Kj in a new initialization phase. However, this "brutal" solution is sometimes extremely inconvenient. In the case of an Internet communication, for example, such an interruption can cause a loss of connection.

SUMMARY OF THE INVENTION

An object of the present invention is to provide a circuit provided with an echo canceller that operates despite variations of operating condition between the initialization and nominal operation phases.

Another object of the present invention is to provide such a circuit that is easy to implement based on a conventional circuit structure.

To achieve these and other objects, as well as others, the present invention provides a circuit for transmitting and receiving communications. The circuit includes a transmit block, a receive block, and an echo canceller, coupled to the transmit block and to the receive block, for determining an echo signal and subtracting it from the received signal, the determination of the echo signal involving a predetermined number N of coefficients calculated at the beginning of each of the communications in an initialization phase. The circuit includes means for periodically updating, during communication, a restricted group of coefficients chosen from among the most significant coefficients.

According to an embodiment of the present invention, said restricted group is formed by the maximum coefficient obtained at the end of the initialization phase and a defined number of its neighbors.

According to an embodiment of the present invention, said restricted group is formed by all the coefficients having a value at the end of the initialization phase which is greater than a predetermined threshold.

According to an embodiment of the present invention, the determination of the coefficients in the initialization phase and the updating of the coefficients of said restricted group are performed iteratively, the calculation mode for the updating of the coefficients of said group making the coefficients converge more slowly than the calculation mode for the determination of the coefficients during the initialization phase.

According to an embodiment of the present invention, the echo canceller includes a filter receiving samples transmitted by the transmit block and providing the echo signal to a first input of a subtractor, a second input of which receives samples received by the circuit and the output of which is connected to the input of the receive block.

According to an embodiment of the present invention, the filter includes:

N series-connected delay elements, receiving the transmitted samples,

N multipliers, each multiplier being provided for multiplying by one of the coefficients the sample at the output of the delay element of same rank, and an adder for summing up the signals at the output of the multipliers.

The present invention also provides an echo canceling method in a circuit adapted for transmitting and/or receiving a respectively transmitted and/or received signal, and in which a signal representative of the echo is subtracted from the received signal, the signal representative of the echo being determined by summing up N terms, each term being obtained by multiplying a sample of rank i of the transmitted signal by a coefficient of rank i, i ranging between 1 and N. The method includes the steps of:

in an initialization phase corresponding to the beginning of a communication, determining the value of the N coefficients of rank i, determining the most significant coefficients, and during the communication, updating the coefficients of a restricted group of said coefficients chosen from among the most significant coefficients.

The foregoing objects, features and advantages of the present invention will be discussed in detail in the following non-limiting description of specific embodiments in connection with the accompanying drawings.

DETAILED DESCRIPTION

According to the present invention, a restricted group of significant coefficients is identified from among coefficients $K_i$, at the end of the initialization phase. Then, during circuit operation, only this restricted group of coefficients is periodically updated. The applicant has devised this solution after various studies having shown, among others, the difficulties of periodically updating all the coefficients of filter 20.

Figure 1:
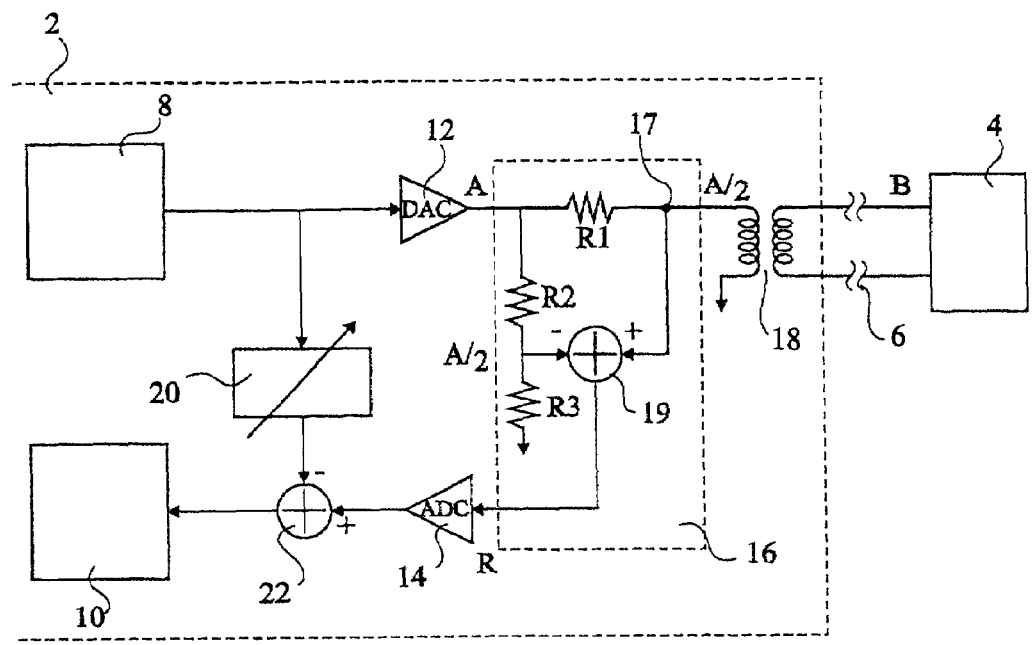
FIG. 1, previously described, shows a conventional circuit including an echo canceller.
Figure 2:
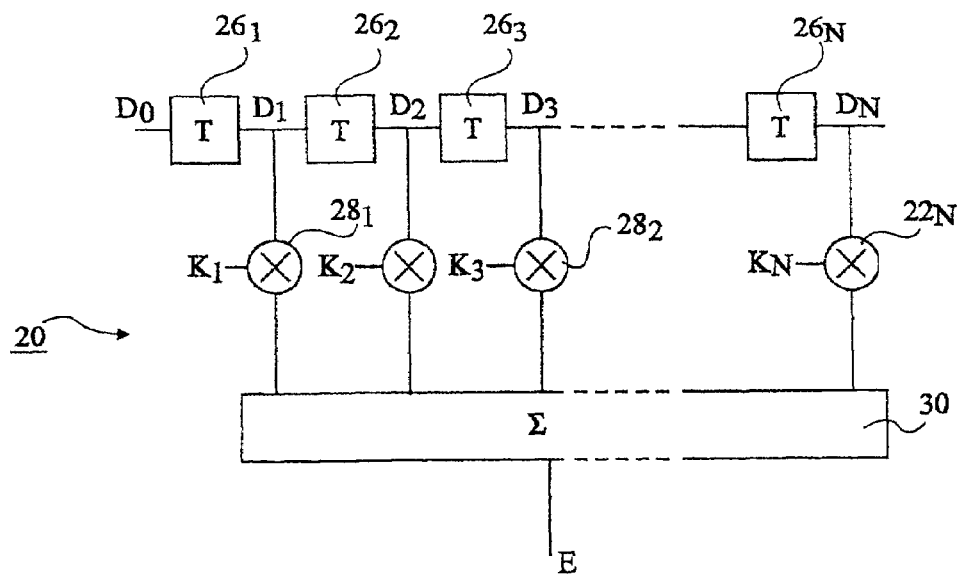
FIG. 2, previously described, schematically shows a filter of the echo canceller of FIG. 1.
Figure 3:
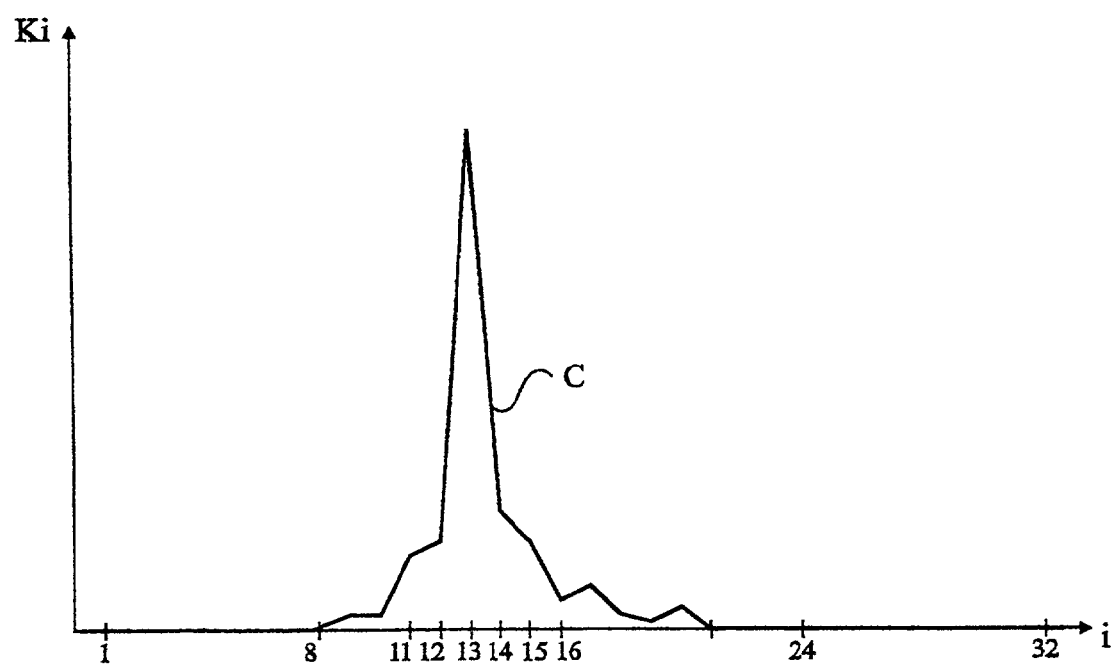
FIG. 3 shows a diagram schematically illustrating the values of coefficients used in the filter of FIG. 2.

FIG. 3 shows a curve C illustrating the value of the coefficients of filter 20 obtained at the end of an initialization phase. N=32 coefficients have been shown herein, but in practice, number N may be any number. Very generally speaking, tests have shown that curve C exhibits a peak, and that the number of the significant coefficients is small. According to the present invention, the coefficient retained as being the most significant one is the coefficient corresponding to the peak of the initialization curve. In FIG. 3, the maximum coefficient is the thirteenth coefficient, $K_{13}$. The other significant coefficients can be determined in several ways.

According to an embodiment of the present invention, the other retained coefficients are the coefficients having a rank which is an immediate neighbor of that of the maximum coefficient. The number of retained coefficients is a predetermined number. This number may be determined, for example according to the total number of coefficients, or may be automatically determined based on curve C by appropriate calculation means. In FIG. 3, a group of five significant coefficients $K_j$ including the coefficients of rank 11, 12, 13, 14, and 15 is for example chosen.

When the circuit operates, the present invention provides periodically updating the significant coefficients according to the following formula:

$$K_j(t)=K_j(t-1)+\epsilon'.Err(t).D_j(t) \qquad (2)$$

where j is the rank of any one of the retained coefficients (11, 12, 13, 14 or 15 in the given example), where $K_j(t)$ and $K_j(t-1)$ respectively are the value of coefficient $K_j$ at time t of the iteration and in the preceding iteration, where $\epsilon'$ is a predetermined attenuation factor, and $Err(t)$ and $D_j(t)$ respectively are the output signal of subtractor 22 and sample $D_j$ at time t of the iteration.

The calculation means intended for implementing formula (2) can be the same as the calculation means intended for implementing formula (1), controlled for only processing the restricted group of coefficients $K_j$.

Attenuation coefficient $\epsilon'$ is chosen to be smaller than attenuation coefficient $\epsilon$ of the initialization phase.

Indeed, a difficulty of the updating of the coefficients during a communication is that the received signal R includes both signal B transmitted by the exchange and echo $\Delta A$, much fainter than B. Taking a coefficient $\epsilon'$ on the order of $\epsilon$, the successive iterations do not converge and the coefficients take aberrant values. However, since signal B is generally very decorrelated with respect to the echo, it is possible, with a coefficient $\epsilon'$ smaller than $\epsilon$, to reduce the variation speed of coefficients $K_j$ and to obtain their convergence. For example, $\epsilon'$ may be chosen to be 8 times as small as $\epsilon$.

It should be noted that the updating of all the coefficients $K_j$ during communication, even with a very small $\epsilon'$, presents significant difficulties in practice since it is very slow and the obtained coefficients cannot follow the line drifts.

However, the choice of a restricted number of coefficients to be updated, associated with a smaller value of $\epsilon$, enables following the modifications of the operating conditions of the circuit. Thus, the estimated echo remains continually close to the real echo and the signal-to-noise ratio of the signal provided to receive block 10 remains acceptable.

The updating can be performed continually during the communication. In this case, the coefficients of the chosen restricted group will be updated one after the other, starting for example with the coefficient having the highest value. Also, the updating of the restricted group can be periodically performed, a time interval separating two successive updates.

Of course, the present invention is likely to have various alterations, modifications, and improvements which will readily occur to those skilled in the art. Especially, it has been seen in relation with FIG. 3 that the retained significant components could be a predetermined number of coefficients in the vicinity of the maximum coefficient. According to an alternative of the present invention, the retained components are the coefficients, the value of which, at the end of the initialization phase, is greater than or equal to a predetermined percentage of the value of the maximum coefficient. In this alternative, this percentage may be determined according to the total number of coefficients, or may be automatically determined based on curve C by appropriate calculation means.

Also, the updating of the most significant coefficients $K_j$ has been described by means of formula (2) but, in an alternative of the present invention, in the described filter, each coefficient $K_j$ is calculated based on the product of the value of sample $D_j(t)$ provided by delay element $26_j$ and of the output of subtractor 22 Err(t), but those skilled in the art will easily adapt the present invention to a filter in which each coefficient is initialized based on an average of the products of samples $D_j$ to $D_{j+k-1}$ and of the outputs of subtractor 22 Err(t) to Err(t-k+1), where the updating is performed every k samples, according to the following formula:

$$K_j(t)=K_j(t-kt)+\epsilon'\Sigma_{l=0}^{l=k-1}Err(t-1).D_{(j+1)}(t),$$

1 being a variable ranging from 0 to k−1.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for transmitting and receiving communications, including:
    a transmit block,
    a receive block,
    an echo canceller, coupled to the transmit block and to the receive block, for determining an echo signal and subtracting it from the received signal during communication, the determination of the echo signal involving a predetermined number of coefficients calculated at a beginning of the communication in an initialization phase, and
    means for periodically updating, during the communication, a restricted group of coefficients chosen from among the most significant coefficients,
    wherein said restricted group includes a maximum coefficient obtained at an end of the initialization phase and a defined number of its neighboring coefficients.

2. The circuit of claim 1, wherein the determination of the coefficients in the initialization phase and the updating of the coefficients of said restricted group are performed iteratively, a calculation mode for updating of the coefficients of said group making the coefficients converge more slowly than a calculation mode for the determination of the coefficients during the initialization phase.

3. The circuit of claim 1, wherein the echo canceller includes a filter receiving samples transmitted by the transmit block and providing the echo signal to a first input of a subtractor, a second input of which receives samples received by the circuit, and the output of which is connected to the input of the receive block.

4. The circuit of claim 3, wherein the filter includes:
    N series-connected delay elements receiving the transmitted samples,
    N multipliers, each multiplier being provided for multiplying by one of the coefficients a sample at an output of the delay element of same rank, and
    an adder for summing up the signals at an output of the multipliers.

5. A method of echo canceling in a circuit adapted for transmitting and/or receiving a respectively transmitted and/or received signal, and in which a signal representative of the echo is subtracted from the received signal during communication, the signal representative of the echo being determined by summing up N terms, each term being obtained by multiplying a sample of rank i of the transmitted signal by a coefficient of rank i, i ranging between 1 and N, including the steps of:
    in an initialization phase corresponding to a beginning of a communication, determining a value of the N coefficients of rank i,
    determining the most significant coefficients, and
    during the communication, updating coefficients of a restricted group of said coefficients chosen from among the most significant coefficients, said restricted group including a maximum coefficient obtained at an end of the initialization phase and a defined number of its neighboring coefficients.

6. A method of generating an estimated echo signal to correct for echoes in a received signal of a communication, the method comprising acts of:
    determining values of N coefficients during an initialization phase, the N coefficients providing weights to samples of a transmitted signal to form a basis of the estimated echo signal the estimated echo signal being used to modify the received signal during the communication; and updating values of a restricted group of the N coefficients during the communication by selecting the restricted group of the N coefficients based on a coefficient having a greatest value after the initialization phase.

7. The method of claim 6, wherein the act of determining values of the N coefficients includes an act of cross-correlating the transmitted signal with the received signal.

8. The method of claim 6, wherein the act of determining values of the N coefficients includes an act of iteratively adjusting the values to reduce a first error signal derived from a difference between the estimated echo signal and an actual echo signal included in the received signal.

9. The method of claim 8, wherein during the initialization phase, the received signal includes only an actual echo signal and during the communication, the received signal includes the actual echo signal and a communication signal.

10. The method of claim 8, wherein the act of iteratively adjusting values of the N coefficients includes an act of providing a correction term to each of the N coefficients based on the first error signal.

11. The method of claim 10, wherein the act of providing a correction term includes an act of providing a first attenuation factor.

12. The method of claim 6, wherein the act of selecting the restricted group of the N coefficients based on the coefficient having the greatest value includes an act of selecting a predetermined number of coefficients in a vicinity of the coefficient having the greatest value after the initialization phase.

13. The method of claim 6, wherein the act of selecting the restricted group of the N coefficients includes selecting coefficients having a value higher than a predetermined percentage of the greatest value after the initialization phase.

14. The method of claim 11, wherein the act of updating values of the restricted group of the N coefficients includes and act of iteratively reducing a second error signal between the estimated echo signal and the received signal, the received signal including the actual echo signal and a communication signal.

15. The method of claim 14, wherein the act of iteratively reducing the second error signal includes an act of providing a correction term to values of the subset of N coefficients based on the second error signal.

16. The method of claim 15, wherein the act of providing the correction term includes an act of providing a second attenuation factor.

17. The method of claim 16, wherein the act of providing the second attenuation factor includes an act of providing a second attenuation having a value less than the first attenuation factor.

18. An echo canceller comprising:

a first group of coefficients configured to weight samples of a transmission signal to provide a basis for an estimated echo signal, the estimated echo signal being used to modify, when present, a received signal during a communication; and means for adjusting values of an active group of the first group of coefficients, wherein, during an initialization phase, the active group includes the first group and, during a communication phase, the active group includes only a restricted group of coefficients selected from the first group including a maximum coefficient in the first group having a greatest value at an end of the initialization phase.

19. The echo canceller of claim 19, wherein the active group in the communication phase includes only coefficients in the first group having a value within a predetermined percentage of the maximum coefficient.

20. The echo canceller of claim 19, wherein the active group in the communication phase includes only coefficients providing weights to samples immediately preceding and succeeding a sample weighted by the maximum coefficient.

21. The echo canceller of claim 21, wherein the means for adjusting the active group includes means for subtracting the estimated echo signal from a received signal to provide an error signal.

22. The echo canceller of claim 21, wherein the means for adjusting the active group includes means for iteratively adjusting values of the coefficients of the active group to minimize the error signal.

23. The echo canceller of claim 22, wherein the received signal comprises an actual echo signal during the initialization phase and includes a communication signal and an actual echo signal during the communication phase.

24. The echo canceller of claim 22, wherein the error signal is minimized by providing a correction term to the active set of coefficients, the correction term including an attenuation factor.

25. The echo canceller of claim 24, wherein the attenuation factor during the initialization phase is greater than the attenuation factor during the communication phase.

26. The echo canceller of claim 25, wherein values of the coefficients of the active group are adjusted periodically during the communication phase.

27. The echo canceller of claim 21, wherein the means for adjusting the active group includes means for iteratively adjusting values of the coefficients of the active group to reduce the error signal.

28. The echo canceller of claim 27, wherein the received signal comprises an actual echo signal during the initialization phase and includes a communication signal and an actual echo signal during the communication phase.

29. The echo canceller of claim 28, wherein the error signal is reduced by providing a correction term to the active group of coefficients, the correction term including an attenuation factor.

30. The echo canceller of claim 29 wherein the attenuation factor during the initialization phase is greater than the attenuation factor during the communication phase.

31. The echo canceller of claim 30, wherein values of the coefficients of the active group are adjusted periodically during the communication phase.

* * * * *

UNITED STATES PATENT AND TRADEMARK OFFICE
CERTIFICATE OF CORRECTION

PATENT NO. : 7,065,056 B2
APPLICATION NO. : 09/896827
DATED : June 20, 2006
INVENTOR(S) : William Glass It is certified that error appears in the above-identified patent and that said Letters Patent is hereby corrected as shown below:

On the title page, item (74) should read :
    (74) *Attorney, Agent, or Firm* – Lisa K. Jorgenson; James H. Morris; Wolf, Greenfield & Sacks, P.C.

Col. 2, line 3 should read:
    When there is an echo $\Delta A$, signal R is equal to $B+\Delta A$. To
        line 23 should read:
    adder 30 that sums up the products $K_i.D_i$. Adder 30 provides
        line 34 should read:
    $K_i(t) = K_i(t-1) + \varepsilon.Err(t).D_i(t)$ Column 4, line 61 should read:

$$K_j(t) = K_j(t-kt) + \varepsilon' \sum_{l=0}^{l=k-1} Err(t-1).D_{(j+l)}(t)$$

Signed and Sealed this

Twenty-fourth Day of October, 2006

JON W. DUDAS
*Director of the United States Patent and Trademark Office*